United States Patent Office 2,868,449
Patented Jan. 13, 1959

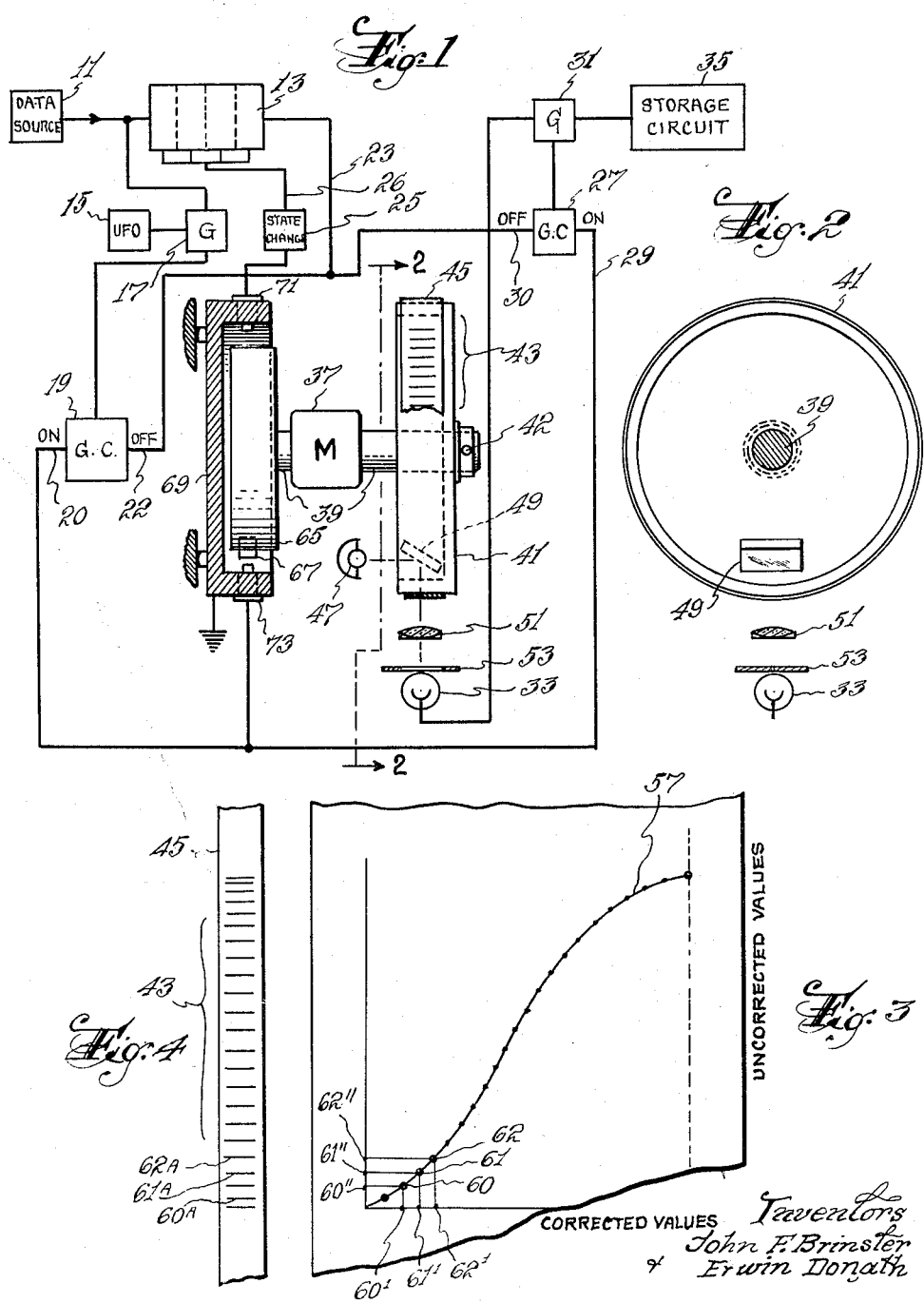

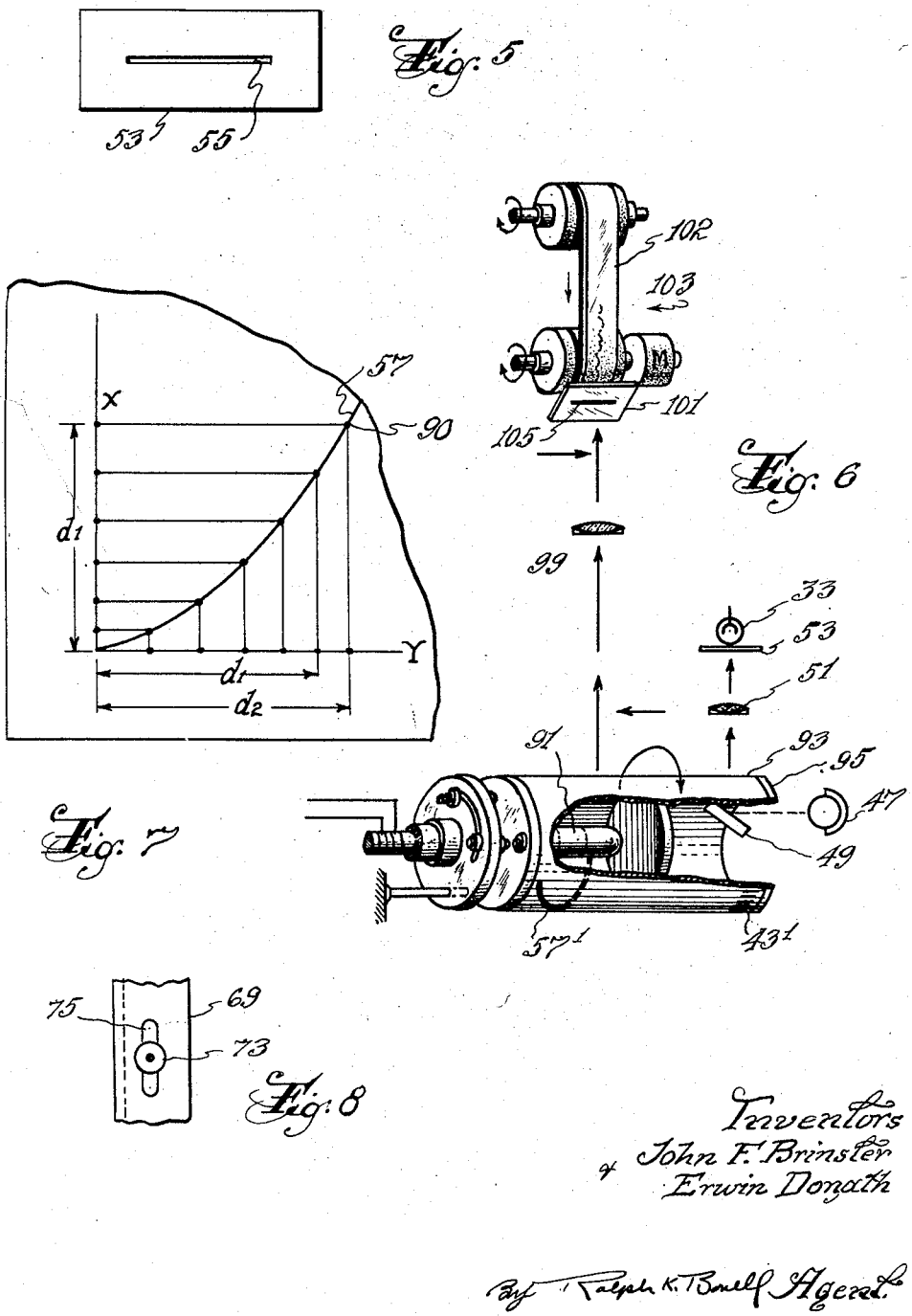

2,868,449

NUMERICAL DATA CORRECTOR

John F. Brinster and Erwin Donath, Princeton, N. J., assignors to Applied Science Corporation of Princeton, Princeton, N. J., a corporation of New Jersey Application December 9, 1953, Serial No. 397,187

4 Claims. (Cl. 235—61)

The invention refers to electrical computing and data processing apparatus and is particularly directed toward the provision of automatic means for modifying digital data in accordance with pre-established, non-linear relationships. The present invention is related to our co-pending applications for "Plotter," Serial No. 377,092, filed August 28, 1953, and "Numerical Tabulator," Serial No. 397,189, filed concurrently herewith, also, to our co-pending application, joint with Homer M. Hill, Jr. for "Method of Circuit for Counting Impulses," Serial No. 321,704, filed November 20, 1952, all assigned to the assignee of the present invention.

In processing digital data in electrical computers and like apparatus, linear transformations are accomplished by well known and comparatively simple means. Non-linear transformations, however, present a more difficult problem, particularly where high precision is required, and often involve complex circuit arrangements. The present invention provides means adaptable to the carrying out of non-linear transformations with a high degree of precision, and which are of a relatively simple character. Transformations are effected as follows: The pre-established relationship between input and output values, originally exhibited in graphical form, for instance as a calibration curve, is employed to lay out a series of parallel marker lines, non-uniformly spaced in accordance with the non-linearity of said relationship. A value of the data to be transformed, represented by a number stored by a counter (or other storage means adapted to read-out) is materialized, by read-out of said counter, as a sequence of impulses, uniformly spaced in time, the duration of this sequence defining a read-out period. During the read-out period the display of non-uniformly spaced marker lines is scanned at a constant rate by photo-electric means and the sequence of impulses thereby developed supplied to an output circuit, which may include a second storage counter. The count of impulses in this last sequence is a corrected or transformed version of the number stored by the first counter.

In one application thereof, the above-outlined transformation may constitute an intermediate step in the automatic recording of numerical values of graphical data, means for accomplishing which, without said transformation, are disclosed in other of our co-pending applications, previously identified herein. Thus, the digital data to be transformed by the means of the present invention may result from the scanning of a graphical record of said data, to measure the effective ordinates thereof, by means disclosed in said application Serial No. 377,092, while the numerical values of the transformed digital data may be printed by the apparatus disclosed in said application Serial No. 397,189.

Among other features, application Serial No. 377,092 discloses means for carrying out non-linear transformations of graphical data, to produce a graphical record of corrected data and, if these same data are processed by the means of the present invention and the same transformations made, the results may be recorded, for example, by the printer of application Serial No. 397,189 at intervals along said graphical record to identify the values of selected ordinates thereof, thus providing a combined graphical and numerical display of corrected data.

It is an object of the present invention to provide circuit means for effecting non-linear transformations of electrical data.

It is another object to provide means for modifying digital data in accordance with a pre-established non-linear relationship displayed in graphical form.

It is a further object to provide an improved method of introducing corrections into digital data.

Other objects and advantages will be apparent upon consideration of the following specification, taken in conjunction with the appended drawings, in which:

Fig. 1 is a combined front elevational view (partly in section) and circuit diagram, of one embodiment of the invention.

Fig. 2 is a section along the line 2—2 of Fig. 1.

Fig. 3 is a curve exhibiting a non-linear relationship, together with construction lines relating thereto.

Fig. 4 is a partial developed view of a film strip bearing indicia positionally related to the curve of Fig. 3.

Fig. 5 is a front elevation of a light mask.

Fig. 6 is a perspective showing of apparatus for effecting simultaneous corrections to graphical and digital data.

Fig. 7 is an enlarged section of the curve of Fig. 3, together with construction and dimension lines relating thereto.

Fig. 8 is a partial bottom plan view of the apparatus of Fig. 1.

Referring, now, to Fig. 1, a source of digital data 11 is shown connected to a storage counter 13 for registration and storage of individual values of the data thereby. A source of uniformly spaced impulses at an adjustable frequency, illustrated as variable frequency oscillator 15, also is connected to the input of counter 13 by way of electronic gate 17, actuated by gate control 19 having "on" and "off" leads 20 and 22, respectively. Suitable circuits for gate 17 and gate control 19 (and for other components similarly designated herein) are shown in application Serial No. 397,189, Figs. 9 and 10, respectively. A trigger impulse applied to "on" lead 20 of gate control 19 opens gate 17 and a similar impulse applied to "off" lead 22 closes the gate.

Counter 13 preferably registers a count of input impulses as a binary number and may be of the type disclosed in application Serial No. 321,704. Among other characteristics a counter of this type is cyclically operable in that upon reaching its counting capacity it is re-set by the next unit input impulse to a pre-selected count, which may be zero. Simultaneously, the counter supplies an output impulse or signal, as to lead 23, Fig. 1. Also, in a counter of the type referred to, an initial registration may be changed to the "complement" thereof upon the application, individually to the several counting stages of a so-called "state change impulse." Circuit 25 when suitably actuated supplies such an impulse to lead 26, which is branched to all stages of counter 13. The "complement" of a stored count, as the term is used herein, is the difference between the count and the counting capacity of the counter or other storage device. In changing to this "complement" each binary stage of counter 13 reverses its registration.

The output of counter 13 is connected to "off" lead 30 of gate control 27 having "on" lead 29 and likewise to "off" lead 22 of gate control 19. Gate control 27 governs the operating condition of gate 31, in circuit intermediate phototube 33 and output storage circuit 35. This storage circuit may comprise a second counter having characteristics suited to such further processing as the data may undergo. A constant speed motor 37 drives shaft 39 on which transparent drum 41 is mounted for rotation therewith. Adjustment of the position of drum 41 about shaft 39 is provided by set screw 42. Drum 41 bears a display of indicia in the form of opaque marker lines 43 generally non-uniformly spaced about the periphery thereof and preferably occupying somewhat less than half of the extent of the periphery. Lines 43 may be directly inscribed on the surface of the drum but are more conveniently formed photographically in either negative or positive form on a film strip 45, a portion of which is shown in Fig. 4. Film 45 may be wrapped about drum 41, as shown in section in the figure, or inserted therein in contact with the inner surface thereof. Lines 43 are scanned, responsive to the rotation of drum 41, by lamp 47, mirror 49, lens 51, mask 53 and phototube 33. Mask 53 (Fig. 5) has a narrow aperture 55 accommodating, in the projected image of the surface of drum 41, a single marker line, only. Rotation of drum 41, therefore, results in a series of generally non-uniformly spaced impulses in the output of phototube 33 corresponding, respectively, to the passage of the images of lines 43 past aperture 55. Thus, the means displaying lines 43, and associated scanning means, constitute a source of generally non-uniformly spaced impulses.

The spacing of lines 43 is determined as follows: Using calibration curve 57 (Fig. 3) as the original display of the non-linear relationship between untransformed or uncorrected data and transformed or corrected data, a series of points, exemplified by points 60, 61, 62, is spotted along this curve, whose projected positions along the "Y" axis (the axis of Corrected Values) are uniformly spaced, as projections 60', 61', 62', of points 60, 61, 62, respectively. Their projections, as 60'', 61'', 62'', on the "X" axis (the axis of Uncorrected Values) are, in general, non-uniformly spaced. If curve 57 is drawn to a suitable scale, this spacing of points along the "X" axis can be used directly as the spacing of lines 43 in laying out their positions on film strip 45, the positions of lines 60A, 61A, 62A, (Fig. 4), for example corresponding, respectively, to those of points 60'', 61'', 62''. In practice, the described geometrical construction preferably is carried out at an enlarged scale by special apparatus and a photographic reproduction made to a reduced scale for use as film 45.

The precision of the transformation effected by the means of the invention is principally determined by the spacing adopted for the construction points used in deriving the spacing of lines 43 from curve 57. By the use of mechanical aids in the layout process and of optical reduction in the reproduction of film strip 45, or its equivalent, from a prototype, a resolution of better than one quarter of one percent of full scale may be attained in measuring a displacement of film 45 as a count of marker lines.

In addition to drum 41, there is mounted on shaft 39, for rotation therewith, a disc 65 of non-magnetic material bearing a projecting plug 67 of permanent magnet material. In axial alignment with rotatable disc 65 is a stationary drum or disc 69 mounting two electro-magnets, 71 and 73, respectively, spaced approximately 180 degrees apart and each comprising a core having a polar portion thereof positioned closely adjacent the trajectory of plug 67 and bearing a winding for the development of impulses therein, induced by relative displacement of said plug and core. For phasing purposes magnets 71 and 73 are each adjustable in angular position by displacement along a slot, as slot 75 (Fig. 8).

The operation of the described embodiment of the invention is as follows: Assuming initially, that a count of impulses supplied by source 11 is stored by counter 13, rotation of disc 65 causes magnetic plug 67 to generate an impulse in the winding of magnet 71, by magnetic induction, which, applied to and shaped by circuit 25, supplies a state change impulse to each of the counting stages of counter 13 causing registration of the complement of the original count. Subsequently, plug 67 generates an impulse in the winding of magnet 73 which actuates gate control 19, by way of "on" lead 20, to open gate 17 and permit uniformly spaced oscillations or impulses from oscillator 15 to reach counter 13, thereby, defining a time reference which is the start of the read-out period and also defining an origin for the scan, relative to the series of lines 43. The same output impulse is applied to "on" lead 29 of gate control 27 to open gate 31 and thereby provide a transmission path between phototube 33 and counter 35. After its counting capacity is reached, which occurs when the number of read-out impulses equals the initially stored count, the next unit input impulse to counter 13 results in an output impulse on lead 23 which is applied to "off" lead 22 of gate control 19 to close gate 17 and stop the flow of impulses to the counter and also to "off" lead 30 of gate control 27 to close gate 31, thereby terminating the read-out period.

Instead of employing one impulse more than the initial count to terminate read-out, as in the above-described method of operation, a read-out sequence having the exact count may be used if circuit refinements disclosed in application Serial No. 321,704, but not shown herein, are provided, whereby an additional impulse, counted by the counter, is derived from the state change impulse, prior to read-out. Recourse to such additional means generally is not warranted when large numbers are being dealt with, as the additional precision achieved is then not comparable to the precision of the effected transformation.

During the read-out period marker lines 43 are scanned at a constant rate as a result of the constant speed of rotation of drum 41. If these lines were uniformly spaced the number counted during the read-out period would be directly proportional to the duration of said period and hence to the count read out of counter 13 by the uniformly spaced impulses from oscillator 15, that is, proportional to the untransformed or uncorrected datum value. The actual non-uniformity of the spacing of lines 43 which reflects the non-linearity of the desired transformation exhibited by calibration curve 57 through the geometrical construction described in connection with said curve, results in the count of lines 43 during the read-out period being, instead, a measure of the sought-for transformed or corrected datum value.

This may be better understood by consideration of Fig. 7 in which a portion of calibration curve 57 of Fig. 3 is reproduced to an enlarged scale, including a series of selected points along the curve and their projections on the co-ordinate axes thereof, as previously referred to in connection with the layout of lines 43. Considering, for example, point 90 on this curve, this point has co-ordinates $d_1$ and $d_2$ along the "X" and "Y" axes, respectively. The transformation ratio R at point 90, therefore, is $d_2/d_1$. The number $n_1$ of non-uniformly spaced projected points comprised in the distance $d_1$ along the "X" axis is the same as the number of uniformly spaced projected points in the distance $d_2$ along the "Y" axis, by construction. If the spacing of the latter points is $s$, then $d_2 = n_1 s$. Also, if $n_2$ is the number of points at the same spacing $s$ in the distance $d_1$, which can be found by laying off $d_1$ along the "Y" axis, then $d_1 = n_2 s$ and $$R = \frac{n_1}{n_2}$$

It is this last ratio that is employed in effecting the transformation in the operation of the invention. The impulses developed by the scanning of lines 43 during the read-out period provide the count $n_1$, while the uniformly spaced read-out impulses supplied by oscillator 15 during the same period provide the count $n_2$, the periodicity of these last named impulses, by adjustment of the frequency of the oscillator, being made to correspond to the periodicity of impulses that would be developed by scanning a sequence of uniformly spaced marker lines, having a linear spacing s, at the same constant rate as that at which lines 43 are scanned. In fact, oscillator 15, considered as a source of uniformly spaced impulses, may be replaced by a series of marker lines having a uniform linear spacing s, together with scanning means therefor operating synchronously with the scan for lines 43, and the invention comprehends such substitution.

Adjustment of the frequency of oscillator 15, or its equivalent, takes into account the scale at which lines 43 are displayed and the speed of rotation of drum 41. In addition to a scale adjustment, provision is also made for varying the origin employed in counting lines 43, to compensate for a variable zero reference for the data. This adjustment is made by varying the position of magnet 73 along slot 75. Over-all phasing is provided for by set screw 42.

For the purpose of providing a numerical example and referring to Fig. 1, let it be assumed that counter 13 has a capacity corresponding to the number 100, that the data supplied to the counter 13 from the source 11 has a value corresponding to the number 30 and that the correct value of the data should be 33. With the timing means consisting of the motor 37 and the parts 65, 67, 69, 71 and 73 phased with respect to the output of data source 11 and with the markings on strip 45 so that the count corresponding to the data value is supplied to the counter 13 prior to the passage of magnet 67 past the coil 71 and so that the first of the marker lines 43 interrupts light from the source 47 at substantially the same time (or a predetermined time later if "zero" is represented by one or more data pulses) as a pulse is generated in coil 73 by the magnet 67, the motor 37 is set into operation. Accordingly, the sequence of events is as follows:

(1) The counter 13 is set by the count from the source 11 so as to register a value corresponding to the number 30.

(2) A pulse is generated in the coil 71 which resets the counter 13 to a value corresponding to the number 70 or the number 71, depending upon the operation of the counter 13 as described above. Let it be assumed that the counter 13 is set to the value corresponding to the number 71.

(3) Subsequently, an impulse is generated in the coil 73 causing the gate 17 to open and permitting impulses from the oscillator 15 to be applied to the counter 13. At the same time the pulse from the coil 73 opens gate 31, permitting impulses generated by the indicia or lines 43 to pass to the storage circuit 35.

(4) The counter 13 is read-out by the impulses from the oscillator 15 and when the 30 impulses have been supplied by oscillator 15 to the counter 13, a pulse appears at the output of counter 13 which closes gates 17 and 31. Thus the storage circuit receives impulses generated by the indicia 43 during the period that the counter 13 is being read-out. If the indicia or lines 43 are properly spaced and the frequency of the oscillator 15 is set to a value which will permit the correct number of lines to interrupt the light from the source 47 during read-out of the counter 13, 33 lines will have interrupted light from the source 47 during the time that the counter 13 is being read-out. Accordingly, the storage circuit 35 will receive 33 impulses which is the corrected value of the data supplied by the source 11.

In a modification of the invention shown in Fig. 6, a combined reproduction of curve 57 and marker lines 43, referenced 57' and 43', respectively, is displayed on a single support, film 93, mounted on transparent drum 95, corresponding to but longer than drum 41 of Fig. 1. The construction of lines 43' is the same as that of lines 43 and these indicia are displayed in the relationship to curve 57' resulting from such construction, that is, lines 43' correspond in position along the "X" axis (the axis of Uncorrected Values of the curve) to the respective projections on said axis of points on the curve having uniformly spaced projections along the "Y" axis. For convenience, lines 43' are positioned to the right of curve 57' in the illustrated apparatus.

In operation, the rotation of drum 95 results, in effect, in a simultaneous scanning of lines 43' and curve 57', the former being scanned by a re-arrangement of means shown in and described with reference to Fig. 1 of the present application and the latter by means shown in and described with reference to Fig. 1 of application Serial No. 377,092. The means of said last figure are partially reproduced in Fig. 6 of the present application as flash lamp 91, lens 99, mask 101 and recording paper drive 103. Mask 101 (actually positioned close to sensitive recording paper 102) comprises a narrow slit 105 extending in the direction of the "Y" axis of curve 57' and the curve itself is displayed on film 93 as a narrow transparent trace against an opaque background, an image of which is projected on mask 101 by lens 99. The intersection of slit 105 and the image of curve 57' defines a point on the curve which varies in position with the rotation of drum 95 and the accompanying displacement of the curve. If curve 57' and lines 43' are in suitable alignment, a point on curve 57' thus sensed by displacement of the curve along its "X" axis, relative to a stationary reference during a selected period of time, has a "Y" co-ordinate proportional to the number of lines 43' counted by the individual scanning means therefor, during said period, as a result of the same displacement, this relationship having been explained in connection with lines 43. By the flashing of lamp 91, this point can be recorded on paper 102 as an element of curve 107 having an ordinate proportional to said "Y" co-ordinate of the sensed point. If the selected period during which displacement or scanning along the "X" axis occurs is the period of read-out for counter 13 (Fig. 1) then curve 107, as thus plotted point by point, becomes a curve of transformed or corrected data values.

The embodiments of the invention shown herein are by way of illustration and not by way of limitation. The limits of the invention are defined in the appended claims.

We claim:

1. In apparatus for effecting non-linear transformations of digital electrical data, the combination of means for storing a single value of untransformed data having an input and having means for changing a stored value to the complement thereof, read-out means therefor comprising a source of recurrent impulses having a uniform time spacing, means for operating said value changing means, means for supplying said impulses to said input subsequent to the operation of said value changing means for thereby initiating a read-out period, said supplying means being controlled by a pre-established condition of said storing means for terminating said period, a source of a sequence of recurrent impulses having a generally non-uniform time spacing, a count from an established reference in said sequence of said last impulses over the read-out period being a transformed version of the count read-out of said storing means, means for storing a count of said non-uniformly spaced impulses and means controlled with said supplying means and by said first mentioned storing means for supplying said non-uniformly spaced impulses occurring during said read-out period to said means for storing a count of said non-uniformly spaced impulses.

2. In apparatus for effecting non-linear transformations of digital electrical data, the combination of means for storing a count representing an untransformed value of the data having an input and having means for changing a stored value to the complement thereof, a source of recurrent impulses having a uniform time spacing, a source of recurrent impulses having a generally non-uniform spacing, said last spacing measuring successive increments in the value of transformed data corresponding to successive uniform increments in untransformed data, means for operating said value changing means, means for subsequently initiating simultaneous counts of sequences of impulses derived from said two sources, respectively, at a time corresponding to a selected zero value of the data, means controlled by said initiating means for supplying a count of the sequence from said first source to said storing means, means controlled by said storing means and effective when said last-mentioned count equals said count representing an untransformed value of the data to terminate said sequence from said second source, and means actuated in accordance with the count of said last sequence.

3. In apparatus for effecting transformations of digital electrical data, the combination of means for storing a count representing an untransformed value of the data, said means having an input and having means for providing an output after receiving impulses equal to said stored count, a first source of spaced impulses of predetermined spacing, first gating means interconnecting said source and said input, a second source of spaced impulses of predetermined spacing, means operable by said last-mentioned impulses, second gating means interconnecting said last-mentioned source and said last-mentioned means, said first and second gating means being connected to said output providing means for closing said gating means when an output is provided thereby, and timing means synchronized with said second source, said timing means being connected to said gating means for supplying impulses to said gating means for opening said gating means.

4. In apparatus for effecting non-linear transformations of digital electrical data, the combination of means for storing a count representing an untransformed value of the data, said means having an input, having means for changing a stored count to the complement thereof and having means for providing an output after receiving impulses equal to said stored count, a source of uniformly spaced impulses, first gating means interconnecting said source and said input, a source of non-uniformly spaced impulses, means operable by said last-mentioned impulses, second gating means interconnecting said last-mentioned source and said last-mentioned means, said first and second gating means being connected to said output providing means for closing said gating means when an output is provided thereby, and timing means synchronized with said source of non-uniformly spaced impulses, said timing means being connected to said count changing means and to said gating means for supplying impulses first to said changing means and then to said gating means for changing a stored count to the complement thereof and then opening said gating means.

References Cited in the file of this patent

UNITED STATES PATENTS

| | | |
|---|---|---|
| 2,412,467 | Morton | Dec. 10, 1946 |
| 2,428,990 | Rajchman | Oct. 14, 1947 |
| 2,533,242 | Gridley | Dec. 12, 1950 |